United States Patent
Drygulski

[15] 3,645,066
[45] Feb. 29, 1972

[54] PLASTIC PACKAGING MACHINE WITH MULTISEGMENTED HEATER PLATE

[72] Inventor: John V. Drygulski, 51 Silver Spring Road, Short Hills, N.J. 07078

[22] Filed: Feb. 4, 1970

[21] Appl. No.: 8,448

[52] U.S. Cl. .............................................53/112 A, 219/525
[51] Int. Cl. ...........................................................B65b 31/00
[58] Field of Search ...........................53/112; 219/524, 525

[56] References Cited

UNITED STATES PATENTS

| | | |
|---|---|---|
| 2,892,294 | 6/1959 | LaBranche ..............................53/112 |
| 2,426,976 | 9/1947 | Taulman................................219/525 |
| 3,236,998 | 2/1966 | Wertheimer et al. ...............219/405 X |

FOREIGN PATENTS OR APPLICATIONS

| | | | |
|---|---|---|---|
| 323,400 | 9/1957 | Switzerland ..........................219/385 |

Primary Examiner—Travis S. McGehee
Attorney—Peter J. Gaylor

[57] ABSTRACT

A machine for plastic skin packaging and vacuum forming is provided with a multisegmented heating plate wherein all of the heater segments are moved simultaneously. These segments are desirably hinged and arranged to be raised and lowered from the center of the heating section of the machine.

1 Claim, 6 Drawing Figures

INVENTOR.
JOHN V. DRYGULSKI

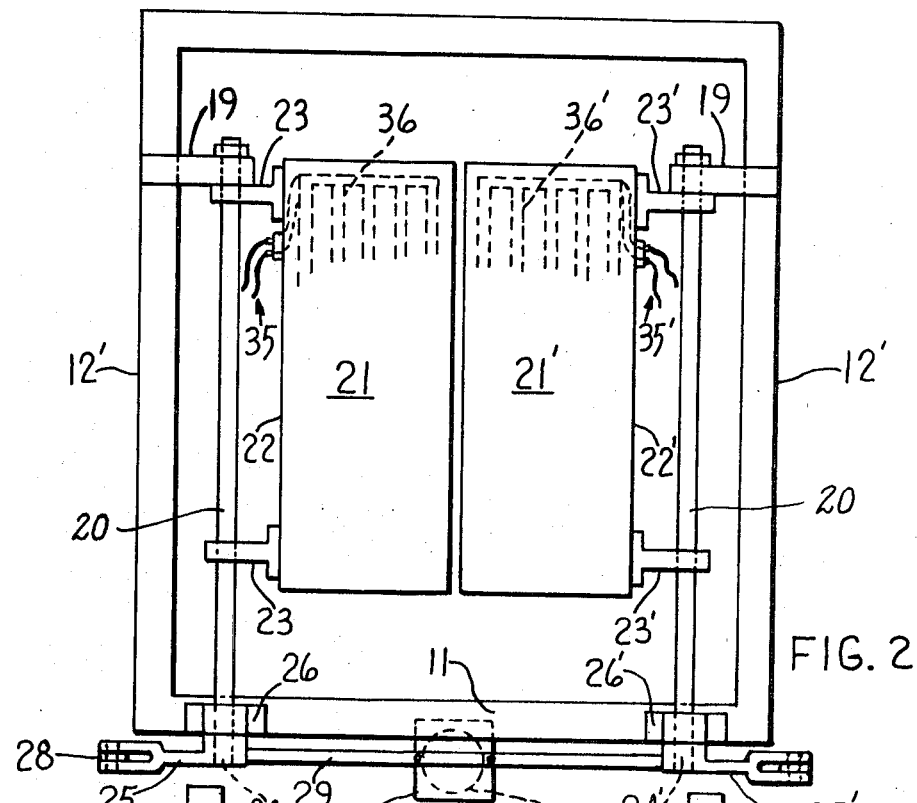
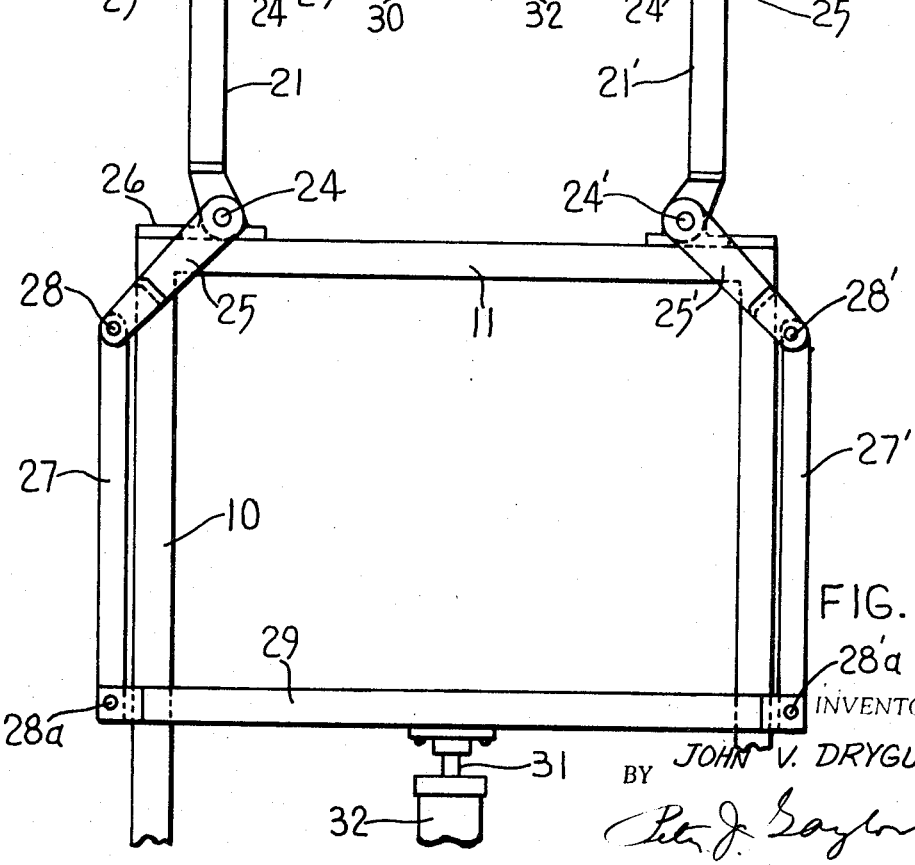

Patented Feb. 29, 1972 3,645,066

INVENTOR.
JOHN V. DRYGULSKI
BY Peter J. Gaylor
ATTORNEY

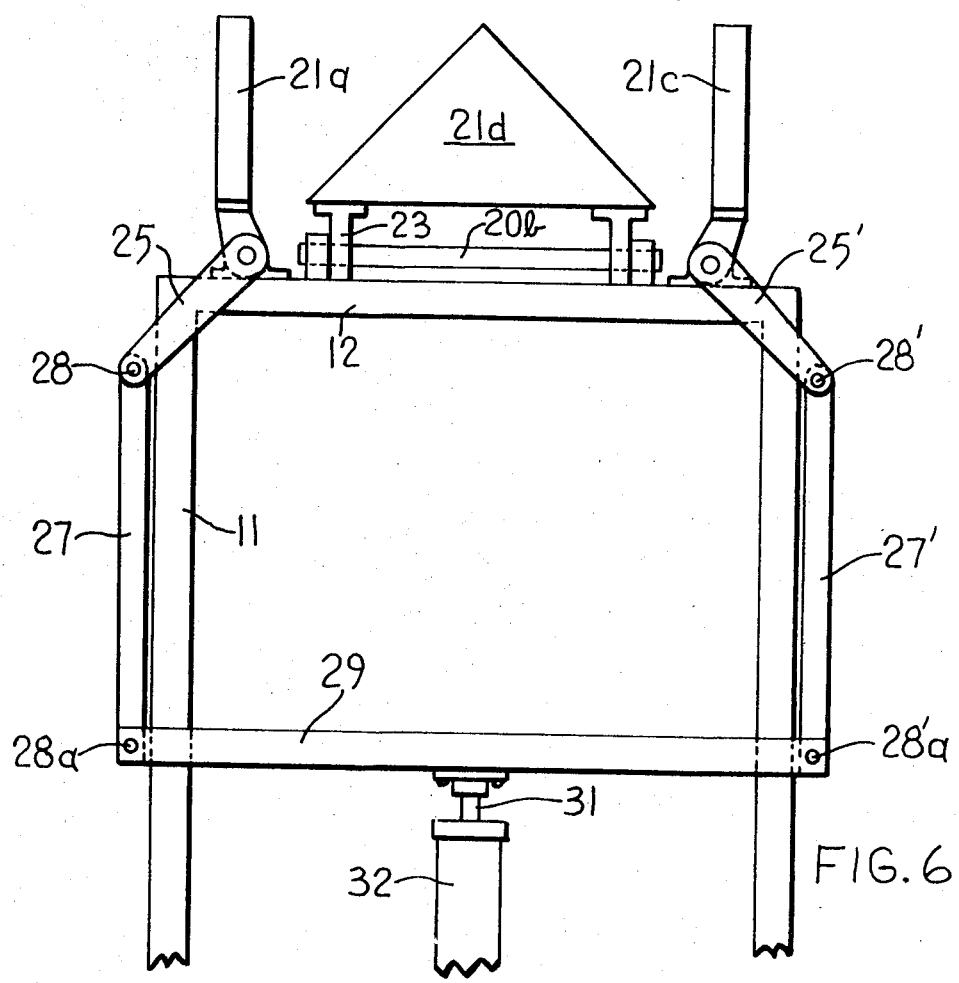

PLASTIC PACKAGING MACHINE WITH MULTISEGMENTED HEATER PLATE

BACKGROUND OF THE INVENTION

The present invention relates to a multiple section heater for plastic skin packaging and vacuum-forming machines.

In the present machines which employ sheet for skin packaging or vacuum forming, the object to be packaged is placed on a platform under a framed plastic sheet. The latter is heated by a hot plate which is moved in laterally from the back to heat the sheet. When the sheet is heated to softening temperature, the hot plate is retracted laterally as the sheet is lowered over the object to be packaged. To prevent conduction of heat into the plastic chamber when the hot plate is retracted, a baffle and often a sandbox are provided under the hot plate to absorb the undesired heat. Some machines leave the hot plate in place and shut off the heat with an on-off switch.

Among the objections to the present heating methods are, first, the uneven heating of the plastic sheet. For example, as the heated plate is being moved laterally to cover the plastic sheet, the portion first covered by the heater becomes unnecessarily overheated by the time the entire sheet is covered. Secondly, the machine requires extra floor space to allow for the retracted plate. Thirdly, the machine cycle is slowed down because of the waiting period required to move the entire hot plate. In the units having on-off switches, there is time wasted waiting for the hot plate to heat up for each article packaged.

SUMMARY OF THE INVENTION

According to the present invention, these advantages are overcome by use of a multisegmented heater plate in which all of the segments are simultaneously moved to uncover or cover the plastic sheet. Although these segments may be moved laterally, they are desirably moved vertically on hinges. Such a heater construction provides a symmetrical heating pattern on the plastic sheet, it enables faster coverage of the heater area because the heater segments swing into position from all sides, thus giving a more efficient heating cycle, and very little, if any, additional floor space is required, since the heater is in the raised position and the undesired heat is directed away from the heating zone.

BRIEF DESCRIPTION OF THE DRAWINGS

The invention will be more readily understood by reference to the accompanying drawings, in which a preferred embodiment is described, and in which:

FIG. 2 illustrates a top or plan view thereof;

FIG. 3 shows a side elevational view of the upper portion of the machine shown in FIG. 1, with heater plate segments in elevated position and with platform and plastic frame left out;

FIG. 6 presents an elevational side view of the upper portion of the machine of FIG. 5, with heater plate segments in raised position, with platform and plastic frame left out.

The same numerals refer to the same or similar parts in the various figures.

DESCRIPTION OF THE PREFERRED EMBODIMENTS

Figure 1:
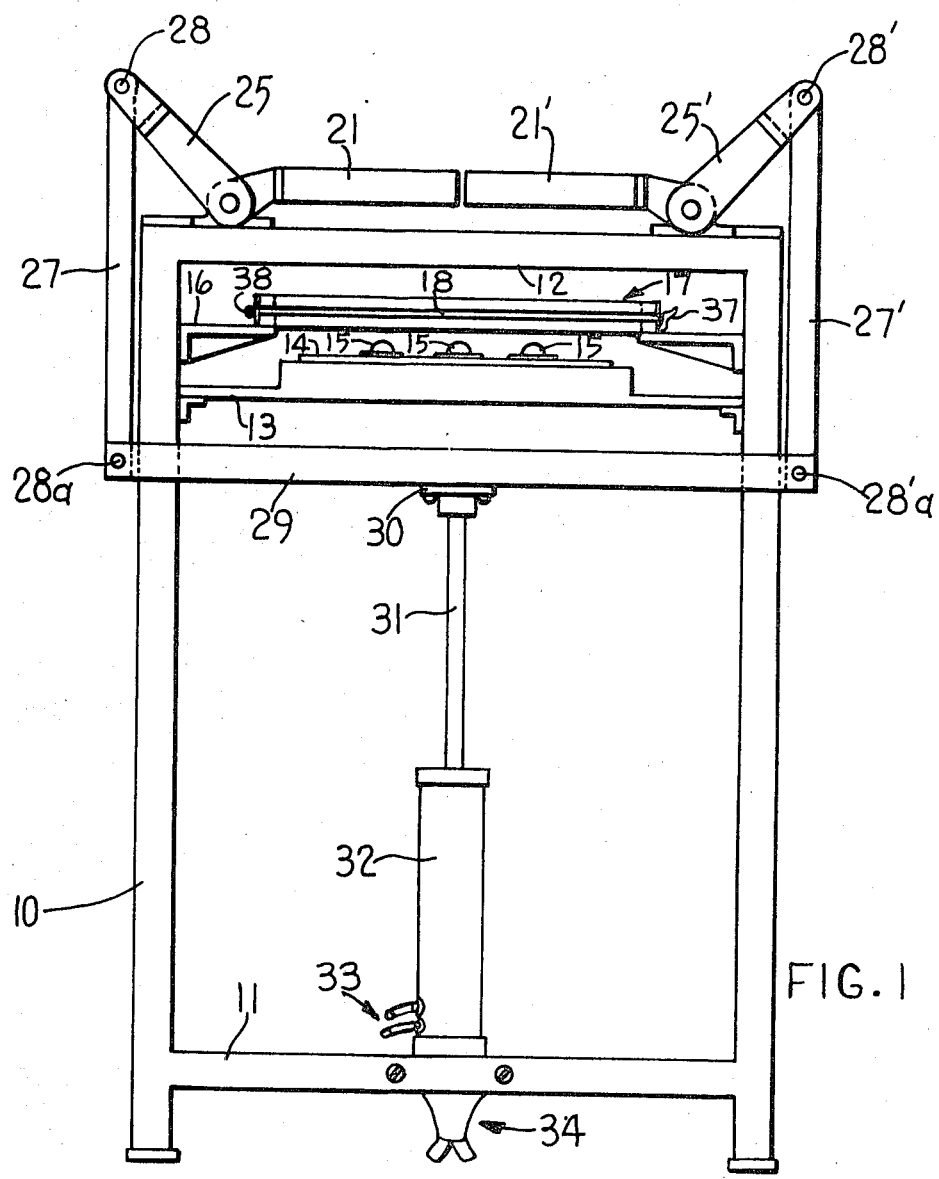
FIG. 1 depicts a side elevational view of one form of a machine of the present invention with dual heater plate segments in lowered position.

Referring to the drawings, numeral 10 designates a vertical frame having bottom crosspieces 11 and upper crosspieces 12. Since the machine is of conventional construction, and only the heating unit has been changed, only those portions of the machine which are necessary to understand the invention are shown.

Disposed in the upper portion of the machine is a platform 13, on which may be laid a cardboard 14 on which the articles 15 are to be packed by means of a plastic sheet. Disposed above platform 13, on ledge 16, is the holding frame, indicated generally as 17, which is used to grip the edges of plastic sheet 18.

Attached at one end to upper frame crosspieces 12' are arms 19 to the other ends of which are attached rotatable shafts 20 and 20', which serve as hinges or swivels for hot plate segments 21 and 21', respectively. Outer edges 22 and 22' of hot plate segments 21-21' are attached to arms 23 and 23', respectively, which, in turn are attached to rotatable shafts 20 and 20', respectively. The ends 24 and 24' of shafts 20 and 20' are attached to one end of toggle arms 25 and 25', respectively. Shafts ends 24 and 24' ride in bearings 26 and 26', respectively, the latter being mounted on crosspiece 12 of the frame.

Vertical arms 27 and 27' have their upper ends swivelly mounted at pivots 28 and 28' to the outer ends of toggle arms 25 and 25', respectively. The lower ends of arms 27 and 27' are also swivelly attached, at pivots 28a and 28a', to crossbar 29.

Attached to crossbar 29, by plate 30, is ram 31 of hydraulic motor 32, which has air outlet and inlet lines 33. Foot pedal switches 34 are provided for manual on-off operation of motor 32. All functions of the machine can be sequenced automatically, if desired.

It is thus seen that when switches 34 are actuated, ram 31 is raised or lowered to raise or lower arms 27-27', which enable toggle arms 25-25' to raise or lower segments or sections 21 and 21' of the heater, using shafts 20-20' as hinge elements. Heater connections 35 and 35' are provided as electrical feeds to heating units 36 and 36', respectively, disposed in sections 21 and 21', respectively.

Figure 4:
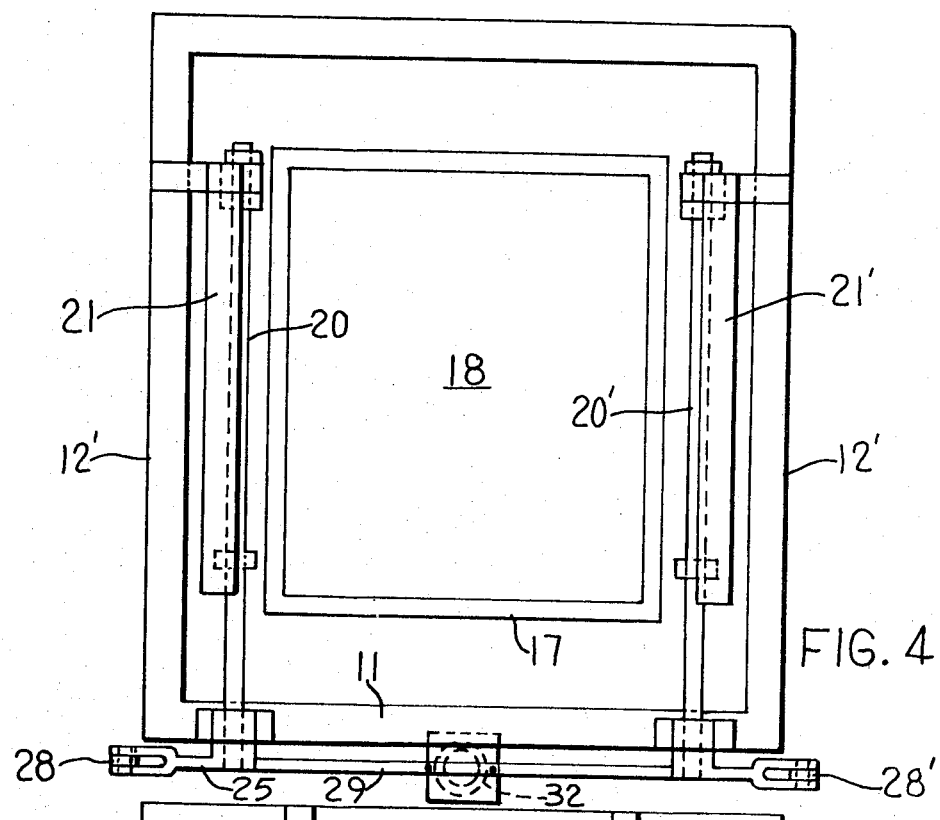
FIG. 4 presents a top view of the unit shown in FIG. 2 with heater plate segments in raised position.

When the machine is started, the heaters are energized and the sections 21-21' are raised, as in FIGS. 3-4. Then toggle lock 37 on frame 17 is opened, and the upper portion of the frame is raised on hinge 38, and a plastic sheet 18 is inserted and the upper portion of the frame is closed and locked in place. It is presumed that cardboard 14 with articles 15 thereon already have been placed on platform 13. Thereafter, switch 34 is actuated to allow ram 31 to extend so as to lower heater segments 21-21' to heat the plastic film 18. When the plastic is adequately softened by the heat, frame 17 is lowered by a suitable mechanism (not shown) over articles 15 and the cardboard base 14, and a vacuum line sucks out residual air as the plastic film cools over the packaged articles. Finally, switch 34 is actuated to raise the heater segments 21-21' to effect a recycle.

Figure 5:
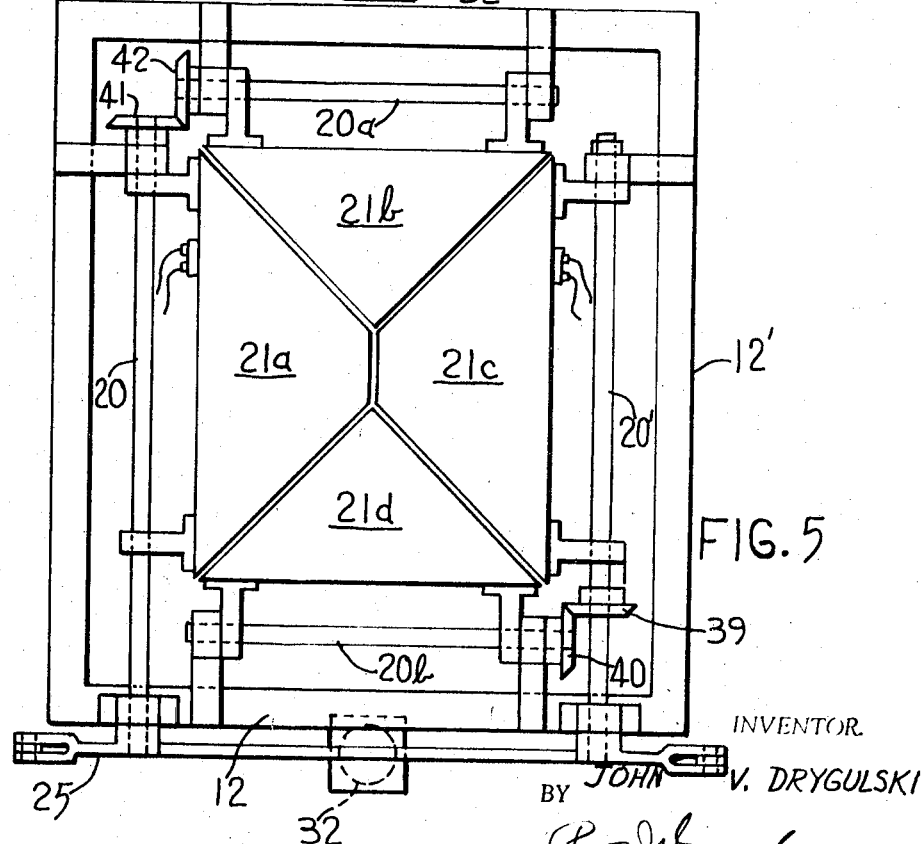
FIG. 5 illustrates a top view of a machine having quadrisegment heater plate unit in lowered position.

In FIGS. 5-6 is shown a heater plate employing four segments or sections 21a, 21b, 21c, and 21d, which is the desired structure of the present invention. Instead of two shafts 20-20', there are now four shafts 20, 20', 20a and 20b. Shaft 20 is connected to shaft 20a by means of bevel gears 41 and 42, and shaft 20' is connected to shaft 20b by bevel gears 39 and 40. Otherwise the operation is the same as in FIGS. 1-4. It will be noted that all of the heater plate sections are in inner edge abutment with each other.

Although two and four-segment heater plates have been described, it is understood that any number of segments may be used. In the event a round heater plate is employed, it may consist of eight triangular segments, for example.

I claim:

1. A plastic film-packaging machine for applying a heat-softened plastic film over an article to be packaged, comprising:
a frame,
platform means disposed on said frame for holding an article to be packaged,
plastic film-holding means disposed on said frame over said platform means,
film-moving means mounted on said frame for moving said plastic film-holding means toward and from said platform means, a flat sectional heater plate consisting of two or more abutting sections disposed over said plastic film-holding means, hinging means for each of said heater sections, comprising:
- a swivel shaft attached to the outer edge of each heater plate section, and
- bearings attached to said frame and in which the ends of said shaft are designed to rotate, raising or lowering means mounted on said frame for raising or lowering the inner edge of each heater plate section simultaneously, each of said latter means comprising:
- a toggle arm attached at one end to one end of said swivel shaft,
- a vertical arm swivelly attached at its upper end to the other end of said toggle arm,
- a horizontal crossbar swivelly attached to the lower end of said vertical arm, and
- moving means for moving said crossbar vertically to raise or lower said heater plate section on said shaft.

* * * * *